(12) United States Patent
Lambæk

(10) Patent No.: US 9,833,936 B2
(45) Date of Patent: Dec. 5, 2017

(54) MOULD TOOL FOR INJECTION MOULDING

(71) Applicant: LEGO A/S, Billund (DK)

(72) Inventor: Jens Stamp Lambæk, Ikast (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 15/313,042

(22) PCT Filed: May 28, 2015

(86) PCT No.: PCT/DK2015/050136
§ 371 (c)(1),
(2) Date: Nov. 21, 2016

(87) PCT Pub. No.: WO2015/180733
PCT Pub. Date: Dec. 3, 2015

(65) Prior Publication Data
US 2017/0203480 A1    Jul. 20, 2017

(30) Foreign Application Priority Data
May 28, 2014   (DK) .................. 2014 70307

(51) Int. Cl.
*B29C 45/26*          (2006.01)
(52) U.S. Cl.
CPC ................. *B29C 45/2675* (2013.01)
(58) Field of Classification Search
CPC .............. B29C 45/2675; B29C 33/306
See application file for complete search history.

(56) References Cited

U.S. PATENT DOCUMENTS

| 2004/0052887 A1 | 3/2004 | Casteel |
| 2011/0045121 A1 | 2/2011 | Chen |
| 2013/0040014 A1 | 2/2013 | Yang |
| 2013/0045293 A1 | 2/2013 | Wei et al. |

FOREIGN PATENT DOCUMENTS

| DE | 102011007995 A1 | 7/2012 |
| DE | 102011007997 A1 | 7/2012 |
| EP | 0287203 A2 | 10/1988 |

(Continued)

OTHER PUBLICATIONS

Danish Patent Office's Search Report for DK priority application No. PA 2014 70307, dated Dec. 8, 2014.

(Continued)

*Primary Examiner* — Jill L Heitbrink
(74) *Attorney, Agent, or Firm* — Day Pitney LLP

(57) ABSTRACT

An injection-molding mold configured for being mounted in an injection-molding apparatus for automated molding of work pieces in plastics, said injection-molding mold comprising at least two separate mold parts that are separated by a mold separation face, and wherein at least one first mold part (1) is configured with an outer frame (2) in which is configured at least one space (14) which is open relative to the mold separation face, in which is mounted at least one exchangeable mold insert (3), and wherein the exchangeable mold insert (3) has a support plate (16) and the mold insert has a recess (20) into which the support plate (16) extends to the effect that the support plate (16) secures the mold insert (3) in the open space (14).

7 Claims, 3 Drawing Sheets

(56) References Cited

FOREIGN PATENT DOCUMENTS

Figure 1:
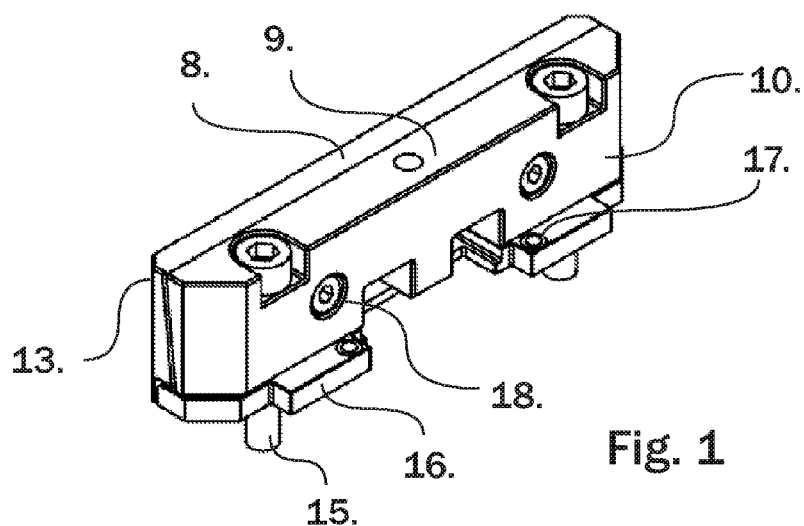

| WO | 2007099763 A1 | 9/2007 |
| WO | 2008025155 A1 | 3/2008 |

OTHER PUBLICATIONS

International Search Report issued in corresponding international application No. PCT/DK2015/050136, dated Aug. 6, 2015.
Written Opinion issued in corresponding international application No. PCT/DK2015/050136, dated Jun. 8, 2015.
International Preliminary Report on Patentability in corresponding international application No. PCT/DK2015/050136, dated May 17, 2016, together with amended sheets of specification and claims, filed on Mar. 10, 2016.

MOULD TOOL FOR INJECTION MOULDING

CROSS-REFERENCE TO RELATED APPLICATIONS

This application is a U.S. National Stage of International Application No. PCT/DK2015/050136, filed on 28 May 2015 and published on 3 Dec. 2015, as WO 2015/180733 A1, which claims the benefit of priority to Danish Patent Application No. PA 2014 70307, filed on 28 May 2014.

PRIOR ART

The present invention relates to an injection-moulding mould configured for being mounted in an injection-moulding apparatus for automated moulding of work pieces in plastics, said injection-moulding mould comprising at least two separate mould parts that are separated by a mould separation face, and wherein at least one first mould part is configured with an outer frame in which is configured at least one space which is open relative to the mould separation face, in which is mounted at least one exchangeable mould insert, and wherein the exchangeable mould insert has a mould cavity side facing out towards the mould separation face, said mould cavity side being delimited by a number of side faces and is provided with one or more mould cavities, and wherein the mould insert is secured in the outer frame by use of at least one mounting fitting which is arranged in the outer frame and each abuts on adjacent side faces on the mould insert.

Such injection-moulding mould is known from eg DE publication disclosure No 102011007995.

OBJECT OF THE INVENTION

Based on this, it is the object of the present invention to provide an injection-moulding mould by which handling of wedge fittings and mould inserts is made safer to the effect that the risk of losing mould inserts in particular is reduced while simultaneously reduced wear is obtained on tool parts and on the mould tool.

This is accomplished by the invention as set forth in claim 1.

Particularly advantageously, the two oppositely oriented wedge faces on each of the wedge-shaped fitting parts have the same angle relative to each other.

A particularly simple handling of the mounting fitting is accomplished by the two wedge-shaped fitting parts being secured to each other in such a manner that they can be shifted relative to each other in a direction longitudinally of the direction by which the wedge faces diverge.

This handling is further facilitated by a preferred embodiment, whereby the support plate comprises at least one elastic holding element which is configured so as to be deformed elastically by introduction of the support plate into the recess.

THE DRAWING

FIG. 1: shows a mounting fitting according to the invention in a perspective view, seen at an angle from above.

Figures 2, 3:
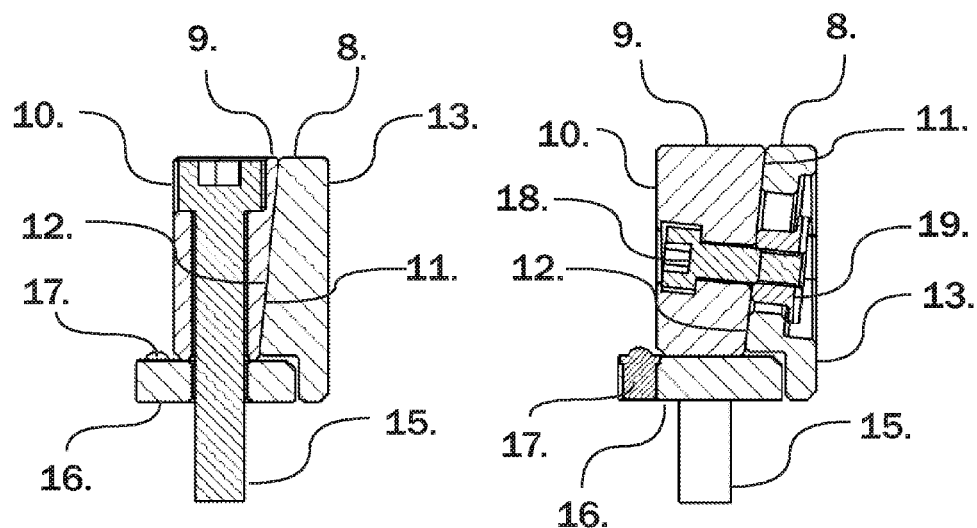

FIG. 2: is a sectional view of the mounting fitting shown in FIG. 1.

FIG. 3: is a sectional view showing a further section through a mounting fitting as shown in FIG. 1.

Figure 4:
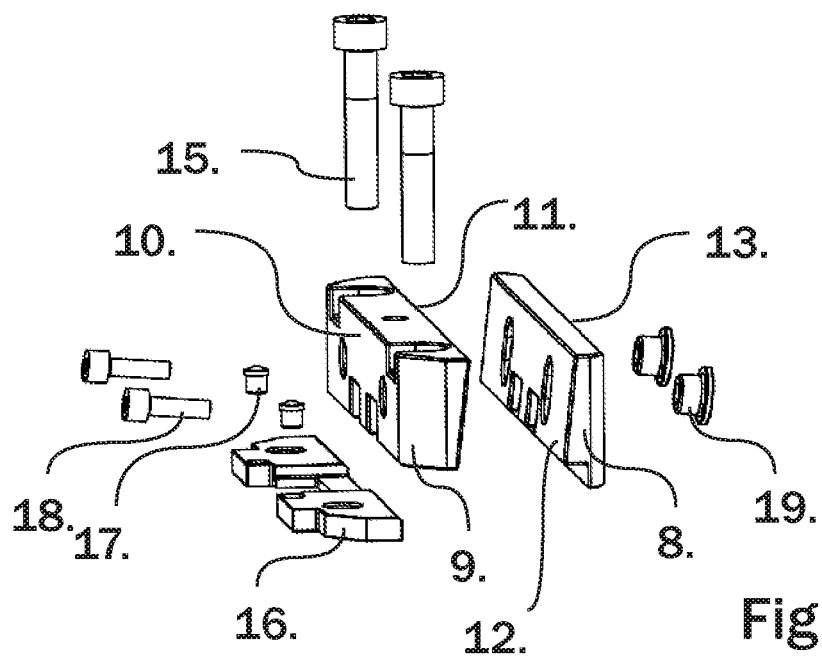

FIG. 4: is an exploded view of the mounting fitting according to FIGS. 1, 2, and 3.

Figure 5:
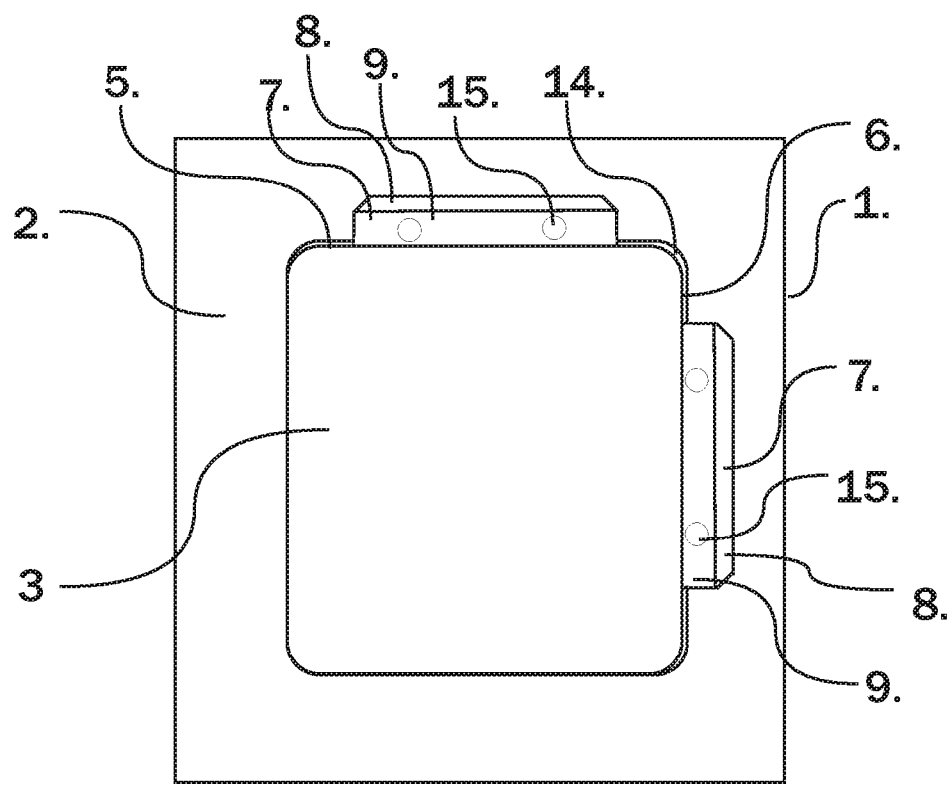

FIG. 5: is an explanatory sketch showing a mould part with a mould insert for an injection-moulding mould according to the invention, seen from in front.

Figure 6:
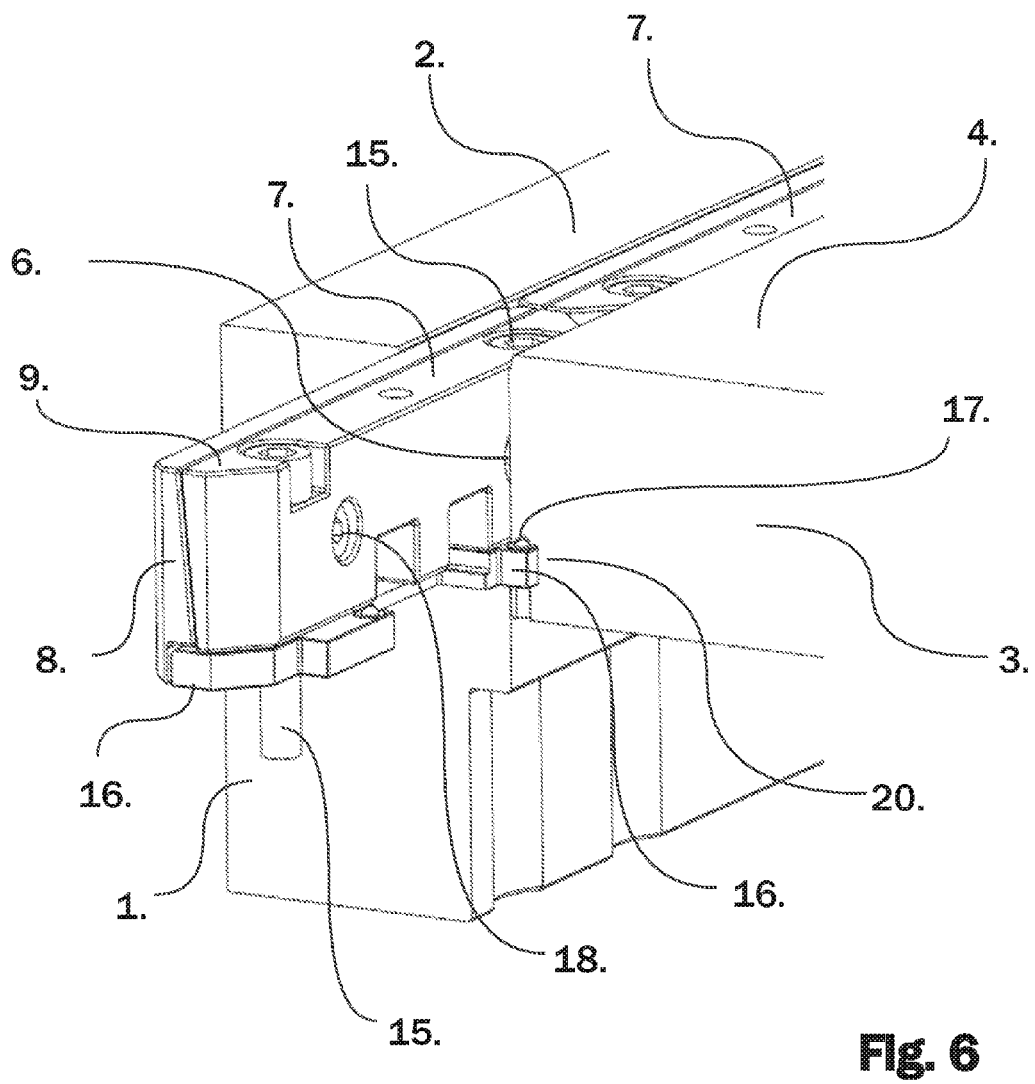

FIG. 6: is a perspective view showing a section through a mould part with a mould insert and a mounting fitting according to the invention, seen at an angle from one side.

DESCRIPTION OF AN EMBODIMENT

Thus, from FIGS. 1, 2, 3, and 4 the same mounting fitting will appear, here configured as a wedge insert 7 according to the invention, which wedge insert has to wedge-shaped fitting parts 8, 9 that are mutually displaceably interconnected by means of screws 18 and the round nuts 19 to the effect that their wedge shape is oriented oppositely, whereby the wedge faces 10, 11 on the one wedge-shaped fitting part 9 diverges in one direction, and the wedge faces 12, 13 diverge in an opposite direction.

The wedge insert according to the invention is mounted by means of the bolts 15 in a mould part 1 as shown in FIG. 5 where the mould part 1 comprises a frame 2 in which an insert 3 is arranged in a space 14 configured to that end, and wherein two wedge fittings 7 are arranged at two adjacent sides 5, 6 on the insert 3.

As shown in FIGS. 5 and 6, the two wedge fittings 7 abut on the side faces 5, 6 on the insert 3, whereby the insert 3 is secured in the space 14. It is accomplished by shifting of the one wedge-shaped fitting part 9 down into the space 14 by the bolts 15 being screwed into threaded holes (not shown) intended therefor arranged at the bottom of the hole 14 in the mould part 1. In this way, the parallel wedge faces 10, 13 are shifted away from each other, and thereby the wedge fitting prevents the insert 3 from shifting substantially in the frame 2. The support plate 16 extending, as shown in FIG. 6, into a recess 20 configured therefor in the insert 3, it is not necessary that, following mounting, the wedge fitting presses against a side face 5, 6 on the insert 3 in the space 14 of the mould part 1. Thereby, the wedge fitting 7 needs only to act to prevent the insert 3 from shifting a lot within the space 14.

According to the invention, this is due to the support plate 16, as shown in FIG. 6, partially extending below the wedge-shaped fitting parts 8,9 and into the recess 20 in the insert 3 at the side faces 5, 6 thereof and thereby ensures that the insert 3 is not able to fall out of the space 14.

The invention claimed is:

1. An injection-moulding mould configured for being mounted in an injection-moulding apparatus for automated moulding of work pieces in plastics, said injection-moulding mould comprising at least two separate mould parts that are separated by a mould separation face, and wherein at least one first mould part is configured with an outer frame in which is configured at least one space which is open relative to the mould separation face, in which is mounted at least one exchangeable mould insert, and wherein the exchangeable mould insert has a mould cavity side facing out towards the mould separation face, said mould cavity side being delimited by a number of side faces and is provided with one or more mould cavities and wherein the mould insert is secured in the outer frame by use of at least one mounting fitting which is arranged in the outer frame and each abuts on adjacent side faces on the mould insert, and where the mounting fitting comprises a support plate; and in that the mould insert comprises a recess that is configured to be complementary to the support plate in a side face on the mould insert; and wherein the support plate and the recess are configured such that the support plate extends into the recess and secures the mould insert in open spaces in the first mould part, characterised in that the mounting fitting further comprises two wedge-shaped fitting parts that each has two wedge faces that are angled relative to each other, and wherein the wedge-shaped fitting parts face opposite each other and abut on each other in such a manner that the wedge faces on the two wedge-shaped fitting parts diverge in mutually opposite directions, and wherein the one wedge face on the one wedge-shaped fitting part is configured to abut on the side face on the mould insert in which the support plate of the mounting fitting extends into the recess on said side face, and the one wedge face on the second wedge-shaped fitting part is configured to abut on a surface in the open space.

2. An injection-moulding mould according to claim 1, characterised in that the two oppositely oriented wedge faces on each of the wedge-shaped fitting parts have the same mutual angle.

3. An injection-moulding mould according to claim 1, characterised in that the two wedge-shaped fitting parts are secured to each other in such a manner that they can be shifted relative to each other in a direction longitudinally of the direction by which the wedge faces diverge.

4. An injection-moulding mould according to claim 1, characterised in that the support plate comprises at least one elastic holding element which is configured so as to be deformed elastically by introduction of the support plate into the recess.

5. An injection-moulding mould according to claim 2, characterised in that the two wedge-shaped fitting parts are secured to each other in such a manner that they can be shifted relative to each other in a direction longitudinally of the direction by which the wedge faces diverge.

6. An injection-moulding mould according to claim 2, characterised in that the support plate comprises at least one elastic holding element which is configured so as to be deformed elastically by introduction of the support plate into the recess.

7. An injection-moulding mould according to claim 3, characterised in that the support plate comprises at least one elastic holding element which is configured so as to be deformed elastically by introduction of the support plate into the recess.

* * * * *